United States Patent [19]
Jestice

[11] Patent Number: 5,289,545
[45] Date of Patent: Feb. 22, 1994

[54] AUDIO SOURCE AND PRIMARY MONITORING STATION COMMUNICATIONS

[75] Inventor: Calvin V. Jestice, Hoffman Estates, Ill.

[73] Assignee: Motorola, Inc., Schaumburg, Ill.

[21] Appl. No.: 685,307

[22] Filed: Apr. 12, 1991

Related U.S. Application Data

[63] Continuation-in-part of Ser. No. 509,915, Apr. 16, 1990, Pat. No. 5,175,727.

[51] Int. Cl.[5] .............................................. H04B 3/00
[52] U.S. Cl. ......................................... 381/77; 381/80
[58] Field of Search ................... 381/77, 80, 81, 119, 381/58; 370/85.9, 85.11, 95.1

[56] References Cited

U.S. PATENT DOCUMENTS

| | | | |
|---|---|---|---|
| 4,550,401 | 10/1985 | Spears | 370/85.9 |
| 4,584,679 | 4/1986 | Livingston et al. | 370/85.9 |
| 4,692,918 | 9/1987 | Elliott et al. | 370/85.11 |
| 4,740,955 | 4/1988 | Litterer et al. | 370/85.11 |
| 4,805,169 | 2/1989 | Van Asselt | 370/85.9 |
| 4,928,097 | 5/1990 | Staab et al. | 370/85.11 |
| 4,965,793 | 10/1990 | Polzin et al. | 370/85.9 |

Primary Examiner—James L. Dwyer
Assistant Examiner—Jack Chiang
Attorney, Agent, or Firm—Timothy W. Markison

[57] ABSTRACT

Audio sources (201–203) may be monitored by one or more consoles (204–206) in a primary monitoring mode. Each audio source designates only one console at a time to continuously update the audio source regarding its selected status, thereby avoiding significant redundant signalling.

19 Claims, 2 Drawing Sheets

AUDIO SOURCE AND PRIMARY MONITORING STATION COMMUNICATIONS

This application is a continuation-in-part of copending U.S. Ser. No. 07/509,915, entitled "A Communication System Network" and filed on Apr. 16, 1990, and patented on Dec. 29, 1992 as U.S. Pat. No. 5,175,727.

FIELD OF THE INVENTION

This invention relates generally to audio signal path methodology, including but not limited to communication systems having consoles capable of monitoring both selected and unselected audio sources.

BACKGROUND OF THE INVENTION

Radio communication systems are well known in the art. Larger and more sophisticated systems typically include a number of operator consoles, from which an operator can monitor one or more different audio sources (such audio sources can include, for example, other console operators, and other individuals communicating via landline or radio links). With reference to FIG. 1, a typical radio communication system console, such as a Centracom Series II console as manufactured by Motorola, Inc., provides two speakers; one renders audible a selected audio source, and the other renders audible a mix of a plurality of other unselected audio sources, all as well understood in the art. The console typically includes an appropriate operator interface, such as a keyboard or the like, to allow an operator to select and unselect from amongst the various audio sources available.

Given the above, it is possible that, at any given moment, a particular audio source may or may not be the selected audio source for one or more consoles. For a variety of reasons, and in support of general operating efficiencies within the system, it is desirable that each audio source be aware of whether any consoles have selected that audio source. To this end, the prior art provides consoles that repeatedly signal, via an internal data network, their current selection.

In relatively small communication systems, such automatic signalling by all consoles on a regular basis adequately meets the needs noted above. As systems have grown larger, however, problems have arisen with respect to this prior art methodology. For example, as the number of consoles increase, the amount of signalling dedicated to these purposes increases as well. The nature of this problem becomes particularly clear when one considers that a plurality of consoles may well be monitoring a common audio source at any given moment. During such periods, the data network becomes filled with redundant messages from different consoles all informing the audio source that it currently has selected status. Such redundant signalling serves no useful purpose and poses the risk of over burdening the throughput capabilities of the data network.

Accordingly, a need exists for a method of assuring that selected audio sources remain informed of their selected status, while simultaneously assuring that the relevant data pathways do not become overburdened by the implementing signalling.

SUMMARY OF THE INVENTION

These needs and others are substantially met by the method for use in a system having a plurality of audio sources and a plurality of consoles that monitor selected audio sources as described herein. Pursuant to this method, when a particular audio source determines that it cannot identify any console that is then currently monitoring audio information from that particular audio source in a primary monitoring mode, the audio source transmits a general inquiry to identify any consoles that are currently monitoring that console in a primary monitoring mode. Upon receiving a response from any consoles acknowledging the general inquiry, the audio source then designates a console as its prime monitor and communicates that designation to the selected console. Thereafter, being designated prime monitor, the designated console transmits information from time to time indicating its prime monitor status and thereby confirming for the audio source its continued selected status.

So configured, consoles only transmit these updates subsequent to prime monitor designation. Therefore, multiple redundant transmissions by two or more consoles monitoring an identical audio source are avoided, while simultaneously assuring that a selected audio source will remain provided with the necessary information regarding selected and unselected status.

DESCRIPTION OF A PREFERRED EMBODIMENT

Figure 1:
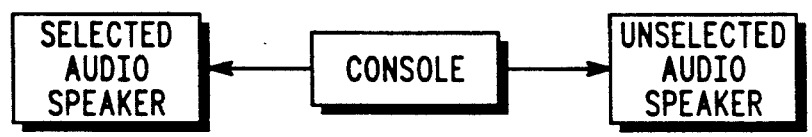
FIG. 1 comprises a prior art block diagram depiction of a console.
Figure 2:
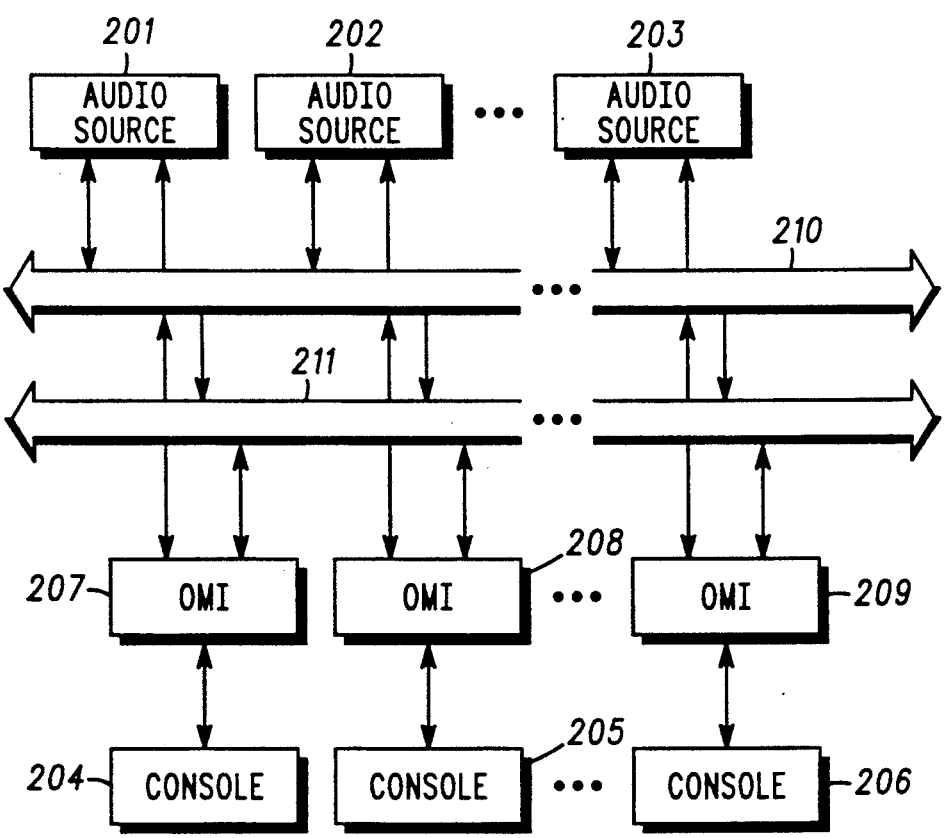
FIG. 2 comprises a block diagram depiction of a communication system configured in accordance with the invention.

Relevant elements and components of a communication system are depicted in FIG. 2. Other components not being particularly relevant to the immediate discussion have not been depicted for the sake of clarity. Such communication systems are, in general, well understood in the art, and for a detailed discussion of such a system, the reader is referred to the above mentioned patent application entitled "A Communication System Network", the contents of which are incorporated herein by this reference.

The communication system includes a plurality of audio sources (201-203), which audio sources are monitored (in either a selected or unselected mode) by a plurality of consoles (204-206) (typically, there are more audio sources than consoles, though this need not necessarily be the case). The consoles interface with the system through operator MUX interfaces (OMI) (207-209). The OMIs, in turn, couple to the system via a data bus (210) and audio bus (211). The audio bus (211) ports the audio signals from the audio sources to their destinations within the system. Similarly, the data bus (210) ports data between elements and components of the system to support various system configuration and operating needs. So configured, an audio source can provide audio information to one or more consoles via the audio bus, and console/OMIs can exchange data signalling with audio sources via the audio bus (210).

In accordance with this invention, the console/OMI and audio source, which constitute programmable platforms as understood in the art, are programmed to act in accordance with a methodology described below. (As used hereinafter, the term "console" shall refer to either or both the console and associated OMI, since the described methodology could be practiced in either or both in a distributed fashion.)

Figure 3A:
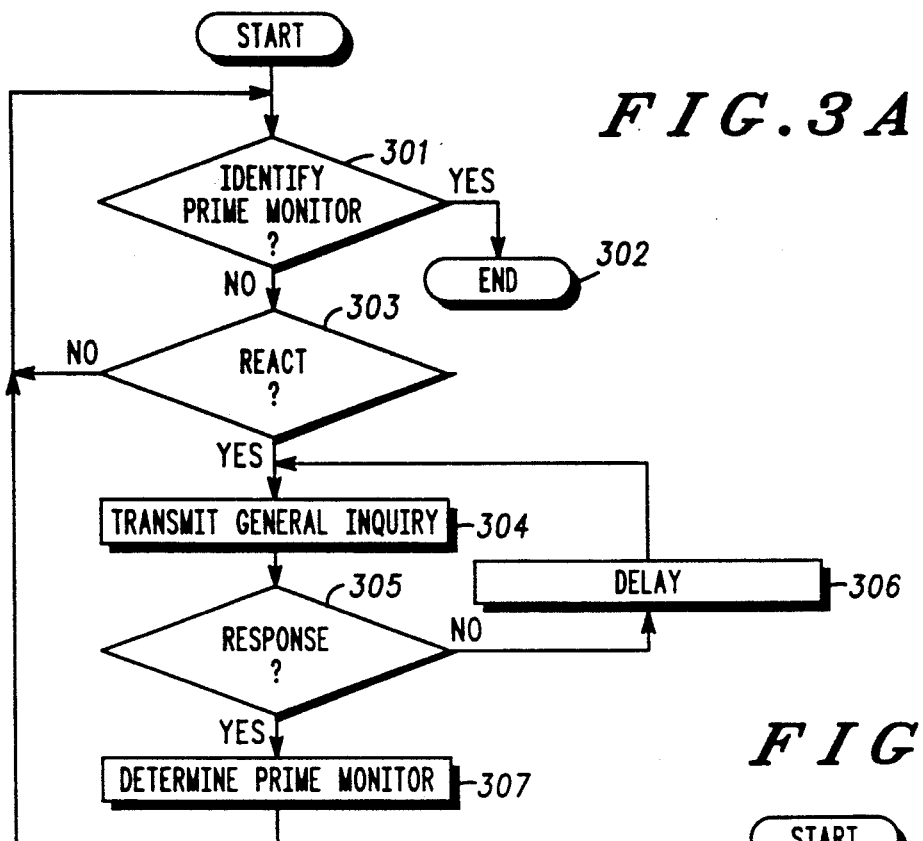
FIGS. 3A and B comprise flow diagrams illustrating operation of an audio source in accordance with the invention.

Referring now to FIG. 3A, each audio source will, from time to time, determine whether it can then identify any consoles that are purporting to monitor the audio source in a primary monitoring mode (i.e., the audio source has been selected by that console) (301). If such a console can be identified, the procedure simply concludes (302). When such a console cannot be identified, the audio source determines whether a reaction should be taken at this time (303). This determination may be a simple test to ensure that an appropriate period of time has passed before taking a reaction, or a more sophisticated inquiry related to particular operating conditions of the system in general, as desired.

When a reaction is to be taken, the audio source transmits, via the data network, a general inquiry (304). This general inquiry constitutes a data message that invites consoles that are monitoring that audio source in a primary monitoring mode to signal such status to the audio source. The audio source then monitors for acknowledgment responses (305). If none are forthcoming, and, in this embodiment, following at least an appropriate delay (306), the audio source repeats its general inquiry transmission (304). Presuming, however, that one or more consoles respond (305), the audio source designates one of the responding consoles as a prime monitor (307), and this designation includes informing the designated console of its designated status.

Figure 3B:
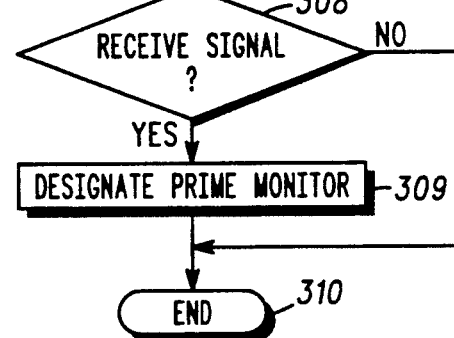

With reference to FIG. 3B, an audio source will also, from time to time, receive unsolicited signals from consoles indicating that the audio source has been selected by a console for primary monitoring. This can occur, for example, when the consoles are configured to automatically transmit such a signal upon initial selection of an audio source. Such a signal may be received prior to the audio source having designated a prime monitor, or subsequent. In either case, upon receiving such a signal (308), the audio source can again consider whether to redesignate the prime monitor position to a new console, or in the case where the newly signalling console is alone in monitoring the audio source, to designate the new console as the prime monitor (309). Thereafter, the process concludes (310), and the audio source continues to operate in accordance with the procedure explained with respect to FIG. 3A, unless another unsolicited signal is received, in which case the audio source again uses the methodology set forth in FIG. 3B.

Figure 4:
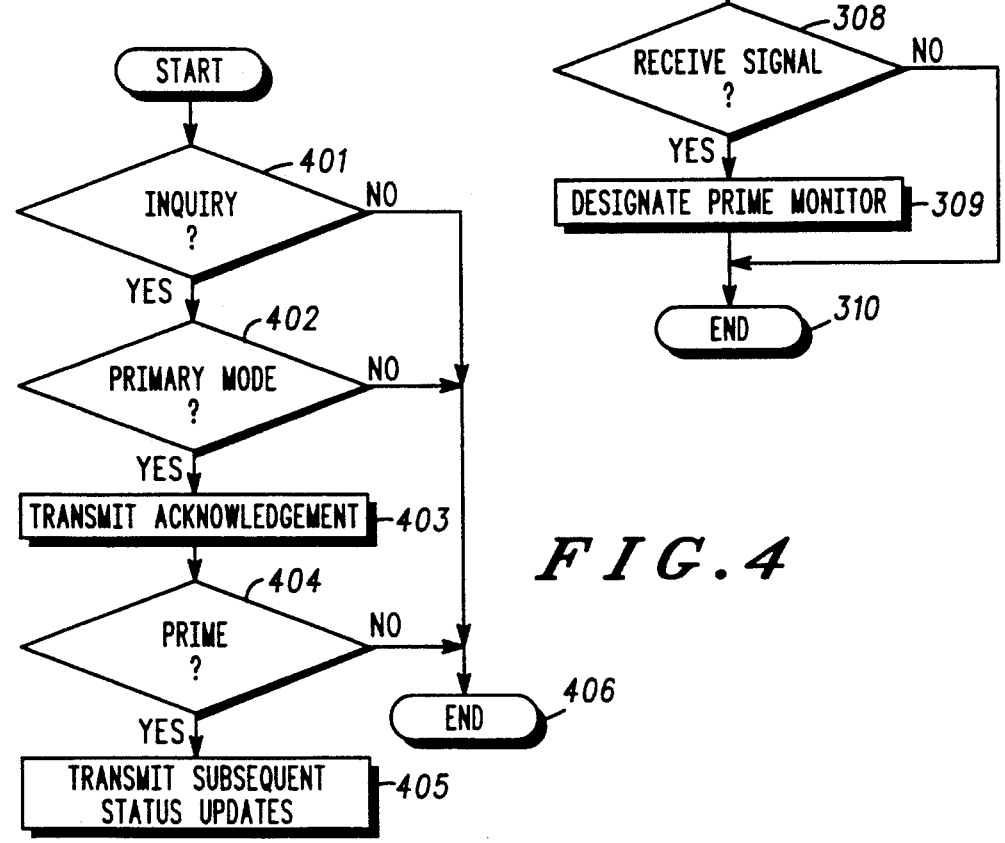
FIG. 4 comprises a flow diagram depicting operation of a console in accordance with the invention.

Referring now to FIG. 4, general operation of the console will be set forth.

Upon receiving a general inquiry (401) as transmitted by an audio source as described above, the console determines whether the inquiring audio source is then currently being monitored by the console in a primary monitoring mode (402). If not, the console takes no further action and the processing concludes (406). If the console is currently monitoring the audio source in a primary monitoring mode, the console transmits an acknowledgment response (403), which response comprises an appropriate data message transported via the data network described above. The console then monitors to determine whether the audio source has designated it as a prime monitor (404). If not, the process concludes (406). If the console does become so designated, however, the console will begin transmitting subsequent status updates (405) from time to time to the audio source via the data network.

It is known in the art that a console can, under certain operating conditions, monitor more than one audio source in the primary monitoring mode. For example, the console operator can select to monitor a particular communication group, which group consists of a plurality of audio sources. Therefore, a first console could elect to monitor group A, which group could include audio sources 1, 2, and 3, while a second console could elect to monitor only audio source 2. The principles of this invention are applicable in this situation. If the first console were the only console to monitor audio sources 1 and 3 in a primary monitoring mode, then that console would be the prime monitor for those two audio sources and would send the appropriate signalling as described above. Audio source 2, however, would select between the two consoles, and would designate only one of the consoles as its prime monitor in accordance with the methodology set forth above.

So configured, only one console at a time will be designated to provide selected audio source information via the data network at any given point in time, regardless of how many consoles may actually be monitoring the audio source in question. At such time as a designated audio source may unselect the audio source in question, of course, the status updates will terminate. The audio source will note, following an appropriate period of time, that no updates are forthcoming, and will thereafter issue a general inquiry and, if any consoles are still monitoring that audio source in a primary monitoring mode, will then designate a new console to support the status update activity.

Accordingly, the audio sources remain aware of their selected status when appropriate, and data signalling to support this awareness is considerably reduced.

What is claimed is:

1. In a system having a plurality of audio sources and a plurality of consoles that monitor selected audio sources, a method comprising the steps of:
   A) when a particular audio source determines that it cannot identify any console that is then currently monitoring audio information from the particular audio source in a primary monitoring mode, transmitting a general inquiry to identify any consoles that are then currently monitoring audio information from the particular audio source in the primary monitoring mode;
   B) upon receiving a response from a particular console acknowledging the general inquiry, the audio source designates that particular console as its prime monitor and communicates that designation to the particular console;
   C) upon being designated prime monitor, the particular console thereafter transmits information indicating its prime monitor status from time to time.

2. The method of claim 1, wherein step A includes the step of:
   A1) determining that it cannot identify any console that is then currently monitoring audio information from the audio source in a primary monitoring mode by determining that no console has contacted the particular audio source within a predetermined period of time to advise the particular audio source of the prime monitor status of that console.

3. The method of claim 1, wherein the audio sources are coupled to the consoles by both a data network and an audio signal network, and wherein the general inquiry is transmitted by the particular audio source using the data network.

4. The method of claim 3, wherein the response from a particular console acknowledging the general inquiry is received using the data network.

5. The method of claim 4, wherein the particular audio source communicates the prime monitor designation to the particular console using the data network.

6. The method of claim 5, wherein the particular console transmits information indicating its prime monitor status using the data network.

7. The method of claim 1, and further including the step of:
   D) when no response from a particular console acknowledging the general inquiry is received, repeating from step B following a predetermined period of time.

8. The method of claim 1, and further including the step of:
   D) When no response from a particular console acknowledging the general inquiry is received, repeating step B following receipt of an unsolicited signal by a console for primary monitoring.

9. In a system having a plurality of audio sources and a plurality of consoles that monitor selected audio sources, a method comprising the steps of:
   A) when a particular audio source determines that it cannot identify any console that is then currently monitoring audio information from the particular audio source in a primary monitoring mode, transmitting a general inquiry to identify any consoles that are then currently monitoring audio information from the particular audio source in the primary monitoring mode;
   B) upon receiving a response from a plurality of consoles each acknowledging the general inquiry, the particular audio source designates one of the plurality of consoles as its prime monitor and communicates that designation to the one console;
   C) upon being designated prime monitor, the one console thereafter transmits information indicating its prime monitor status from time to time.

10. The method of claim 9, wherein step A includes the step of:
    A1) determining that it cannot identify any console that is then currently monitoring audio information from the particular audio source in a primary monitoring mode by determining that no prime monitor console has contacted the particular audio source within a predetermined period of time to advise the particular audio source of the prime monitor status of that console.

11. The method of claim 9, wherein the audio sources are coupled to the consoles by both a data network and an audio signal network, and wherein the general inquiry is transmitted by the particular audio source using the data network.

12. The method of claim 11, wherein the response from a plurality of consoles acknowledging the general inquiry is received using the data network.

13. The method of claim 12, wherein the particular audio source communicates the prime monitor designation to the one console using the data network.

14. The method of claim 13, wherein the one console transmits information indicating its prime monitor status using the data network.

15. The method of claim 9, and further including the step of:
    D) when no response from a console acknowledging the general inquiry is received, repeating from step B following a predetermined period of time.

16. The method of claim 9, and further including the step of:
    D) When no response from a console acknowledging the general inquiry is received, repeating step B following receipt of an unsolicited signal by a console for primary monitoring.

17. In a system having a plurality of audio sources and a plurality of consoles that monitor selected audio sources, a method comprising the steps of:
    at a particular audio source:
    A) determining that the particular audio source cannot identify any console that is then currently monitoring audio information from the particular audio source in a primary monitoring mode;
    B) in response to step A, transmitting a general inquiry to identify any consoles that are then currently monitoring audio information from the particular audio source in the primary monitoring mode;
    C) upon receiving a response from a particular console acknowledging the general inquiry, designating that particular console as a prime monitor, and communicating that designation to the particular console.

18. The method of claim 17, and further including the step of:
    D) from time to time, receiving information from the particular console indicating continued prime monitor status for the particular console.

19. In a system having a plurality of audio sources and a plurality of consoles that monitor selected audio sources, a method comprising the steps of:
    at a particular console:
    A) receiving an inquiry from an audio source regarding whether the particular console is then currently monitoring audio information from the audio source in a primary monitoring mode;
    B) when then currently monitoring audio information from the audio source in a primary monitoring mode, transmitting an acknowledgement to the audio source;
    C) upon receiving information from the audio source indicating that the particular console is a prime monitor for the audio source, transmitting information indicating this prime monitor status to audio source from time to time.

* * * * *